Jan. 11, 1949.  H. MASBRUCH  2,458,717
BULL HALTER AND CONTROLLER
Filed Feb. 25, 1944
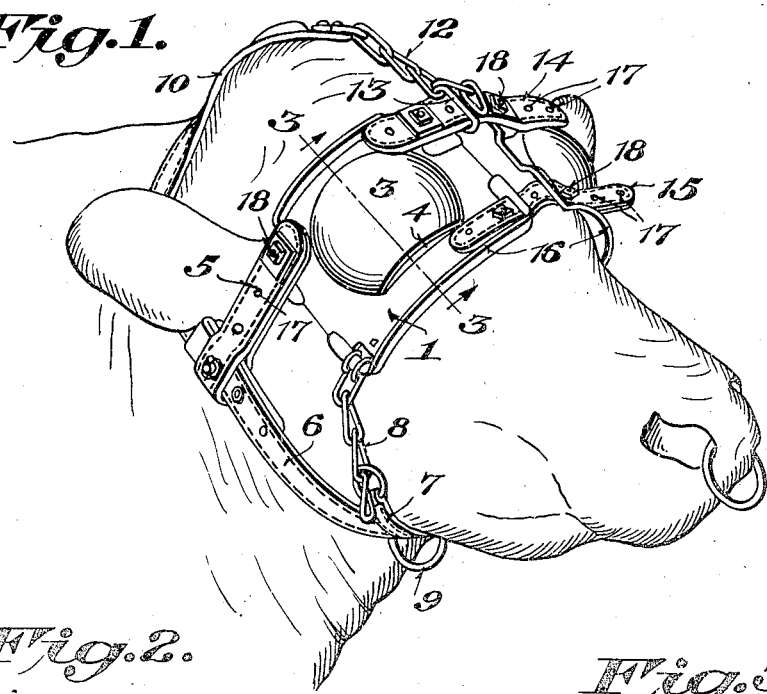
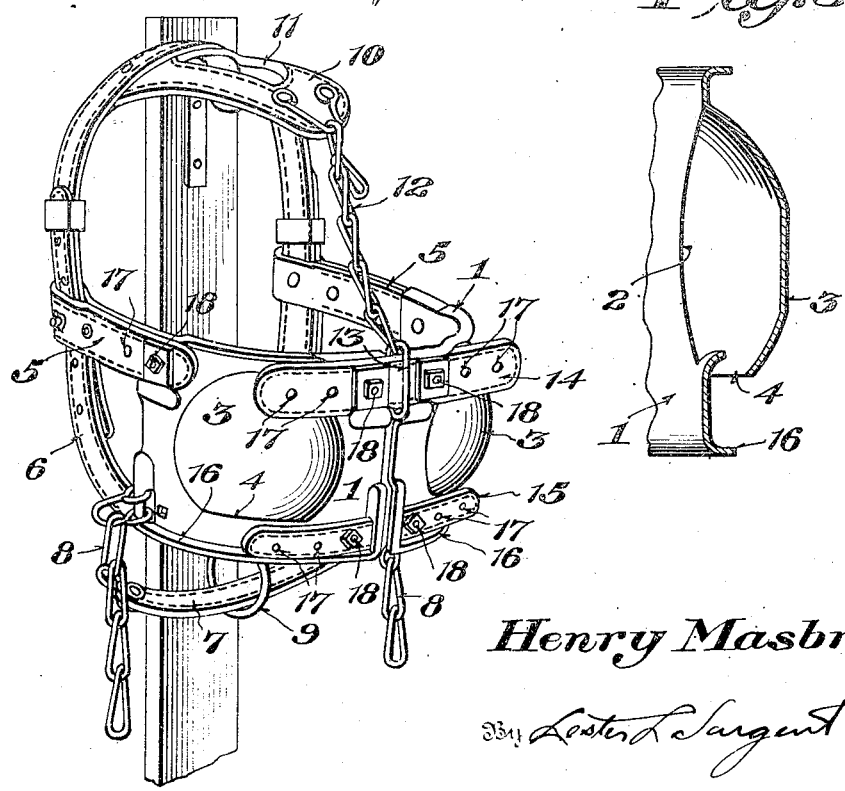
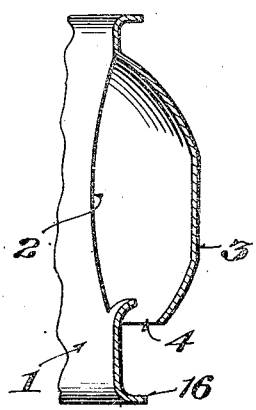
Inventor
Henry Masbruch,
By Lester L. Sargent
Attorney Patented Jan. 11, 1949

2,458,717

UNITED STATES PATENT OFFICE 2,458,717

BULL HALTER AND CONTROLLER

Henry Masbruch, Platteville, Wis., assignor to Russell Manufacturing Company, Platteville, Wis.

Application February 25, 1944, Serial No. 523,954

2 Claims. (Cl. 119—104)

The object of my invention is to provide a novel bull halter and controller which is easily adjusted for any age or breed of bulls and which will fit both polled and horned bulls and which has novel and improved means for adjusting the halter and retaining it on the head of the bull. It is also an object of my invention to eliminate chains as much as possible from the halter and to use leather straps at all points where the chains of former halters have been likely to chafe the animal. It is also a special object of my invention to provide an improved shape of blinders which cannot become clogged with dirt or mud or otherwise annoy the animal to which the halter is applied, while effectively blinding him if he lowers his head to make a charge. I attain these and other objects of my invention by the mechanism shown in the accompanying drawings in which:

Figure 1 is a perspective view of the preferred embodiment of my invention applied to a bull;

Fig. 2 is a perspective of the view of the halter shown detached and hung on a suitable support; and Fig. 3 is a detail section on line 3—3 of Fig. 1, but on a larger scale.

Referring to the accompanying drawings:

I provide a pair of arcuate plates 1, which have outwardly convex-shaped blinders 3, defined by the line 2 where they join the main portion of the plate and having a slot or opening 4 at the bottom of the convex blinders 3, as shown in Fig. 3, to permit a very limited degree of vision in a downward direction to the animal to enable him to see where he is walking but to prevent sight when he lowers his head to charge.

The arcuate plates also have an outwardly turned lower edge 16 both to prevent any sharp edge from rubbing on the animal and also to further restrict the range of vision of the animal.

Affixed to the arcuate plates are side straps 5 which terminate in a loop through which an adjustable neck strap 6 extends, the neck strap passing around the neck of the animal back of the ears. I also provide a chin strap 7 which is connected to the lower outer corners of the arcuate plates 1 by short chains 8. Attached to the neck strap 6 and also engaging the chin strap 7 is a halter ring 9. Suitably affixed to the top of the neck strap 6 is a single head strap 10. This headstrap has a central opening 11 to receive the lump which polled bulls have. Attached to the front end of this strap 10 is a chain 12 that extends from the headstrap of the forehead of the bull and is attached at its lower end by a link 13 to upper straps 14 which are affixed to the respective arcuate plates 1 to hold them in close, but adjustable relation, as shown in Figs. 1 and 2 of the drawings. These straps 14 have a series of apertures 17 to receive the bolts 18 by which an adjustable connection with the arcuate plates 1 is effected. Similar straps 15 are affixed to the lower portions of the arcuate plates 1 and straps 15 also have similar openings 17 and bolts 18 by which spacing of the arcuate plates may be adjusted when the size or shape of the head of the animal makes such an adjustment desirable.

The halter is light and comfortable on the animal and will not chafe or gall. It is adjustable to fit either a yearling or the largest animal. The adjustments are simple and can be made in a few minutes. It is adaptable to fit either the horned or dehorned animals with equal ease. It does not depend on a nose ring for the control of the animal and operates just as effectively on the bull without a nose ring. It does not have any projections to catch on mangers, stanchions, brush or fences. A bull wearing one of these halters will not attack for the moment he puts his head down for a charge he is completely blindfolded.

What I claim is:

1. A bull halter and controller comprising a pair of spaced plates shaped to fit the areas of the bull's head surrounding the eyes, adjustable means to hold the plates securely against said areas irrespective of their spacing, each plate having a blinder which is open only on the under side so as to prevent sight if the bull lowers his head for an attack while permitting limited vision downwardly, and an outwardly turned lower edge on the plate located below the blinder to assist in preventing dirt and debris from lodging in the blinder.

2. A bull halter and controller comprising a pair of spaced plates shaped to fit the areas of a bull's head surrounding the eyes, means to hold the plates securely against said areas, each plate having a blinder which comprises an outwardly convex member joined to the plate, said plate having an opening inside the outwardly convex member, the convex member being larger than said opening so that its lower edge is below the lower edge of said opening but is spaced from and is outside of said opening so as to provide a sight opening in the nature of a slit affording vision downwardly only when the bull holds his head in a normal position, and means extending outwardly from said plate and disposed wholly above the lower edge of the blinder to further restrict the range of vision, and means extending outwardly from said plate and disposed wholly below the lower edge of said blinder to assist in preventing dirt and debris from lodging in said blinder.

HENRY MASBRUCH.

REFERENCES CITED

The following references are of record in the file of this patent:

UNITED STATES PATENTS

| Number | Name | Date |
|---|---|---|
| 863,057 | Douglass | Aug. 13, 1907 |
| 1,912,534 | Masbruch | June 6, 1933 |
| 1,925,928 | Masbruch | Sept. 5, 1933 |

FOREIGN PATENTS

| Number | Country | Date |
|---|---|---|
| 191,928 | Great Britain | Jan. 25, 1923 |